United States Patent [19]
Mallory

[11] 3,746,080
[45] July 17, 1973

[54] ENVIRONMENTAL CHAMBER
[75] Inventor: Roy E. Mallory, Salt Lake City, Utah
[73] Assignee: Mallory Engineering Inc., Salt Lake City, Utah
[22] Filed: Apr. 7, 1971
[21] Appl. No.: 131,879

[52] U.S. Cl. .................................... 165/20, 165/22
[51] Int. Cl. .............................................. F24f 3/14
[58] Field of Search .................. 165/19, 20, 21, 22, 165/60, 64

[56] References Cited
UNITED STATES PATENTS
3,366,165   1/1968   Beeler .................................. 165/22

Primary Examiner—Charles Sukalo
Attorney—B. Deon Criddle

[57] ABSTRACT

An environmental chamber wherein conditions of temperature, humidity, and daylight are simulated to most nearly approximate conditions found in nature. The chamber uses an Xenon lamp as a light source to closely simulate natural sunlight. Within the chamber, light from the Xenon lamp is changeably filtered so as to produce light conditions that nearly approximate the varying sun conditions which exist throughout a typical normal day at a particular location. Temperature and humidity are controlled by air conditioning and heating systems that are programmed to produce atmospheric conditions within the chamber in simulation of actual environmental conditions.

9 Claims, 10 Drawing Figures

Patented July 17, 1973

INVENTOR:
ROY E. MALLORY
BY:
B. Dean Griddle
ATTORNEY

Patented July 17, 1973 3,746,080

INVENTOR:
ROY E. MALLORY

BY:

ATTORNEY

Patented July 17, 1973

✳ NATURAL SUNLIGHT 1:00 P.M., EARLY AUGUST, 4,000 FT. MSL.

INVENTOR:
ROY E. MALLORY
BY:

ATTORNEY

ENVIRONMENTAL CHAMBER

BRIEF DESCRIPTION OF THE INVENTION

1. Field of the Invention

This invention relates to chambers wherein atmospheric conditions including temperature, humidity, and sunlight are artificially simulated to closely approximate conditions found in nature such that actual plant growth, and other botanical, physiological, chemical, ecological and biological responses to such conditions can be studied in a laboratory.

2. Prior Art

Until now, laboratory structures for artificially simulating natural atmospheric conditions have failed to provide an adequate light source with which natural sunlight could be accurately approximated. U.S. Pats. No's. 3,108,399 and 3,124,903, for example, show such chambers using incandescent and flourescent lighting systems. So far as I am aware, however, the prior art devices have not succeeded in simulating all of the varying degrees of intensity of sunlight that exist during the passage of a normal day.

While the prior art structures have somewhat successfully reproduced conditions of temperature and humidity and, by using flourescent and incandescent type light sources have reproduced parts of the sun spectrum, they have not achieved a spectral distribution pattern or light intensity level that is truly representative of natural sunlight. Flourescent and incandescent light sources, do not duplicate that part of the natural light spectrum which plants utilize in their photosynthesis processes, for example, nor do they provide the light intensities necessary to studies of atmospheric conditions on pollutants.

Neither, to my knowledge, has anyone heretofore attempted to filter or change the intensity of a light source such that varying conditions of light intensity that occur during a typical day from sun up to sun down are simulated. The present invention provides an accurate simulation of natural atmospheric conditions of light, light intensity, temperature, and humidity so that a controlled environment exists wherein plant growth and development experiments and other condition responsive experiments can be investigated under the various conditions developed.

SUMMARY OF THE INVENTION

It is a principal object of the present invention to provide an environmental chamber wherein conditions most nearly approximating those found in nature can be accurately simulated and maintained.

Another object is to provide an environmental chamber having a light source which closely approximates most of the plant growth portion of the spectrum of natural sunlight.

Still another object is to provide a variable light filter system which enables the Xenon light within the chamber to be filtered to approximately the varying light conditions which exist in nature during the passage of an actual day.

Principal features of the invention include a cabinet made up of separate and distinct compartments one of which serves as a growth or testing chamber wherein environmental conditions are reproduced and the other of which houses the support apparatus necessary to produce desired conditions within the growth chamber. The growth chamber can be sealed while in use and observations can be made through a glass window in an access door. The window has a door which can be positioned to seal it when observations are not being made and it is desired to prevent variations due to loss of light or entrance of light through the window.

Polished stainless steel walls provide reflective surfaces within the growth chamber, and a light reflector above a light source cooperates with the walls to disperse light rays from a central light source throughout the chamber.

A liquid cooled Xenon arc lamp is used as the light source for the chamber and is positioned in the center of the cabinet and near the roof so that generated light energy is directed onto samples or specimen positioned below it. The Xenon light source operates at high wattage levels, generally from five thousand to six thousand five hundred watts, depending upon the age of the lamp, to provide a high energy light that radiates a spectrum closely conforming to the spectrum of natural sunlight and particularly to that portion of the spectrum necessary to photosynthesis of plants.

Another feature is a light filter system that includes a sheet of film plastic, or similar material, which is colored or smoked to varying degrees of opaqueness. The sheet is mounted to be drawn across the chamber between the Xenon light and samples in the chamber so that the level of light intensity is varied beneath the filter. Filter movement can be controlled manually or automatically by a programmer which regulates filter movement to cause the light emitted from the Xenon light source which is sensed below the filter, to approximate in intensity the varying levels of sunlight a plant, in its natural state, would sense during the passage of a day being simulated or to simulate those light intensities to which smog pollutants, such as automobile emissions, are subjected during the day being simulated.

The growth or testing chamber of the invention also includes an air circulating blower to direct air flow through the interior of the chamber; a humidifier assembly, to introduce moisture into the chamber; a dehumidifier coil, to remove moisture from the air in the chamber; heating and cooling assemblies, to produce desired temperatures; and ducting for directing air movement and for introducing new air into the system.

The apparatus for supporting the equipment in the growth chamber is housed in an equipment enclosure chamber which has a recording and control means for directing and programming the system apparatus suitably arranged on a front panel.

Additional objects and features of the invention will become apparent from the following detailed description and drawings, disclosing what is presently contemplated as being the best mode of the invention.

THE DRAWINGS

In the drawings:

FIG. 1 is a front elevation view of the environmental chamber of the invention;

FIG. 2 a top plan view;

FIG. 3 a section taken on the line 3—3 of FIG. 1, showing the interior of the chamber as viewed from the top;

FIG. 4 a section taken on the line 4—4 of FIG. 2, showing the interior of the chamber as viewed from the front;

FIG. 5 an exploded, perspective view of the Xenon light, its cooling jacket assembly, and a sheet-type light filter assembly;

FIG. 6 a schematic diagram showing the operational components of the growth chamber;

FIG. 7 a chart comparing the spectral energy distribution of a Xenon lamp with that of natural sunlight;

FIG. 8 a chart comparing the spectral energy distribution of an Xenon lamp with that of other types of light sources;

FIG. 9 a chart showing the various zones of light intensity within the chamber; and FIG. 10 a chart showing the energy level of each zone of light intensity, as shown in FIG. 9.

DETAILED DESCRIPTION

Figure 1:
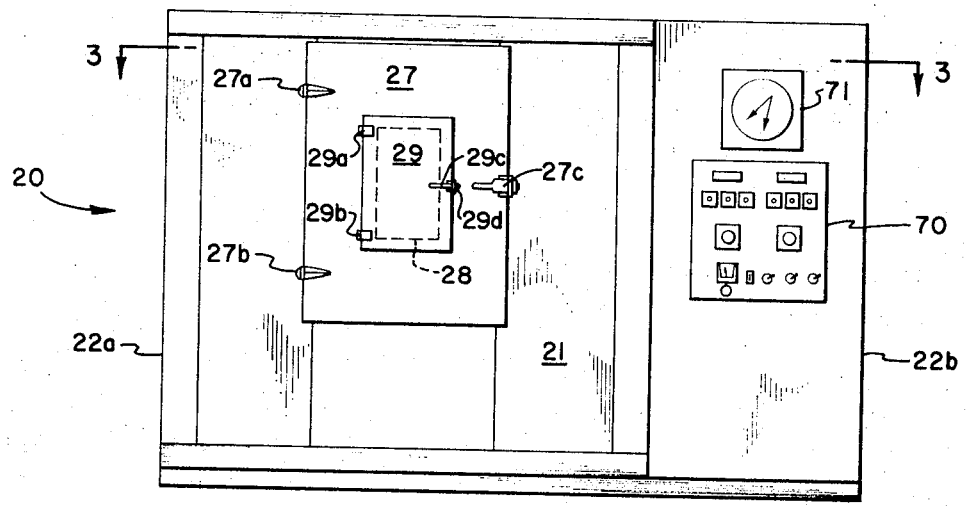
Figure 2:
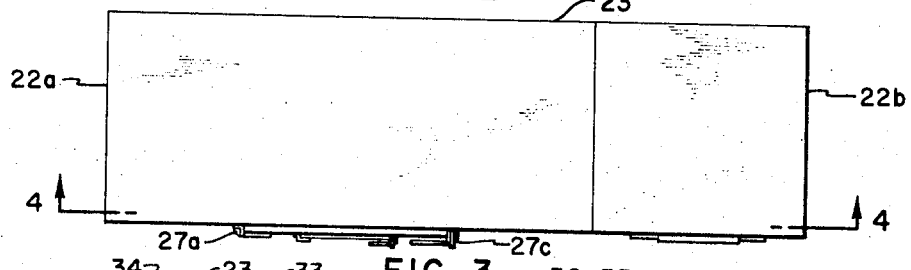
Figure 3:
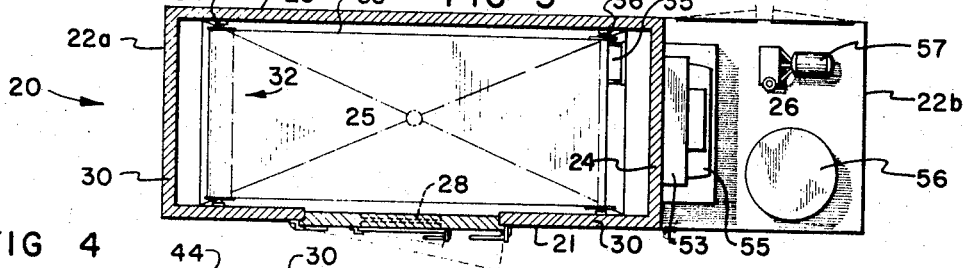
Figure 4:
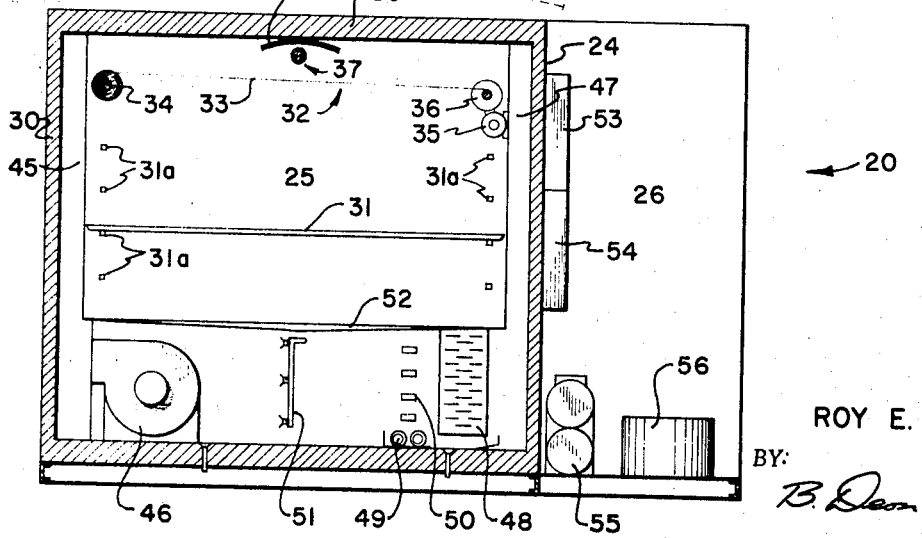

Referring now to the drawings:

The environmental chamber 20 shown in FIGS. 1–4, consists of a cabinet having a front wall 21, side walls 22a and 22b, and a back wall 23. An inner panel 24, extending between walls 21 and 23 separates a growth chamber 25, from an equipment enclosure chamber 26. A door 27, hinged at 27a and 27b and having a locking handle 27c, allows access to the interior of growth chamber 25. An observation window 28 is located in door 27 and a window access door 29, hinged at 29a and 29b to door 27 provides a light seal for the window. Cooperable locking latch components 29c and 29d on the doors 29 and 27, respectively, provide means for locking door 29 over the window. When door 29 is opened observation of conditions within the growth or testing chamber 25 can be made without extensively disrupting the atmospheric conditions therein.

The walls, top and bottom and sides of the growth chamber are all double walls with a layer 30 of insulation between them. This insulation shields the interior of the growth chamber from conditions existing exterior to the chamber. A tray 31, FIG. 4, holds test samples and can be selectively positioned on tray supports 31a that project inwardly from the front and back walls at any desired height within the chamber. A diurnal filter 32, shown installed in the growth chamber in FIGS. 3 and 4, and exploded therefrom in FIG. 5, consists of a filter screen 33, which is colored or smoked to have different degrees of opaqueness along its length. The filter screen 33 is pulled from a spring tensioned reel 34 by a motor 35 that turns a reel 36. Cables 33a and 33b are fixed to an end of screen 33 and are connected to reel 36. As reel 36 is turned by motor 35 to wind the cables, and thereafter the screen 33 thereon, the screen is pulled off reel 34. Reversal of motor 35 will allow the conventional spring mechanism of the reel 34 to rewind the screen. The motor 35 is geared such that tension is maintained in the screen when the motor is not operating. The movement of filter screen 33, beneath a light source 37, changes the light intensity within the chamber beneath the screen in accordance with the opaqueness of the portion of the screen stretched beneath the light source.

It should be understood that a plurality of overlying filter screens and operating means therefor may be used, depending upon the amount of intensity surpression that is desired, and that other filter means may be employed. For example, a sleeve-type filter, not shown, having varying degrees of opaqueness in its wall, could be driven to rotate around the chamber light source.

Figure 5:
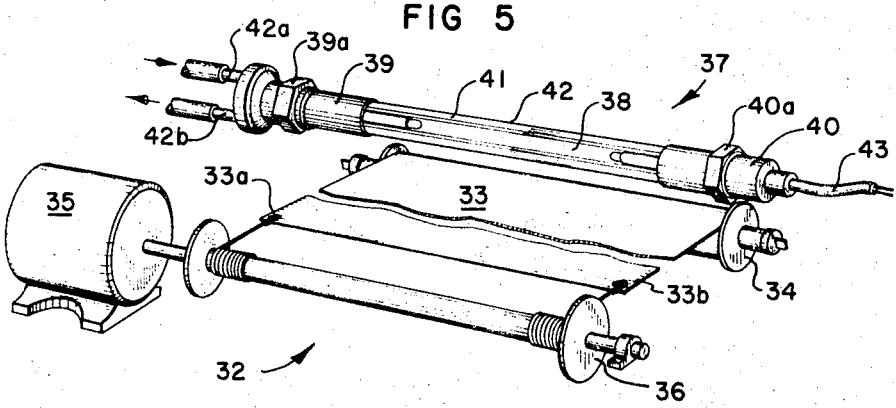

The light source 37, shown best in FIG. 5, consists of a water cooled Xenon tube 38. The Xenon tube very closely reproduces the portion of the sun spectrum used by plants during photosynthesis. The Xenon Bulb 38 is axially mounted between end housings 39 and 40, and inside a pyrex glass tube 41 and a surrounding outer water jacket 42. Coolant liquid is circulated between tube 41 and the outer water jacket 42. Hex nuts 39a and 40a are respectively threaded onto housings 39 and 40 and couple coolant hoses 42a and 42b and an electrical conduit 43 to the light source. Water or other suitable coolant is pumped into the assembly through hose 42a and after it is circulated between the tube 41 and the jacket 42 it flows out through the hose 42b. The Xenon tube 38 normally generates intense heat during its operation which heat is transmitted through the pyrex glass tube 41, to be absorbed in and carried off by the water flowing between tube 41 and water jacket 42. The pyrex glass tube 41 and/or the coolant may be tinted to provide some filtering of those light waves generated from the Xenon tube 38 which are not involved in plant photosynthesis. The cooling of the Xenon tube also greatly prolongs the life of the tube, thereby making it economically practical for use in the chamber.

Figure 9:
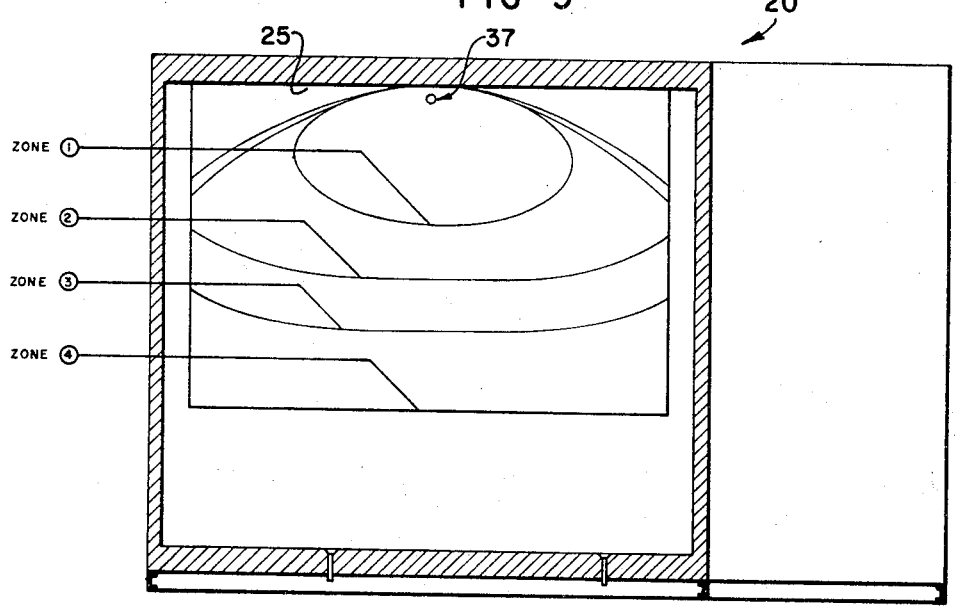
Figure 10:
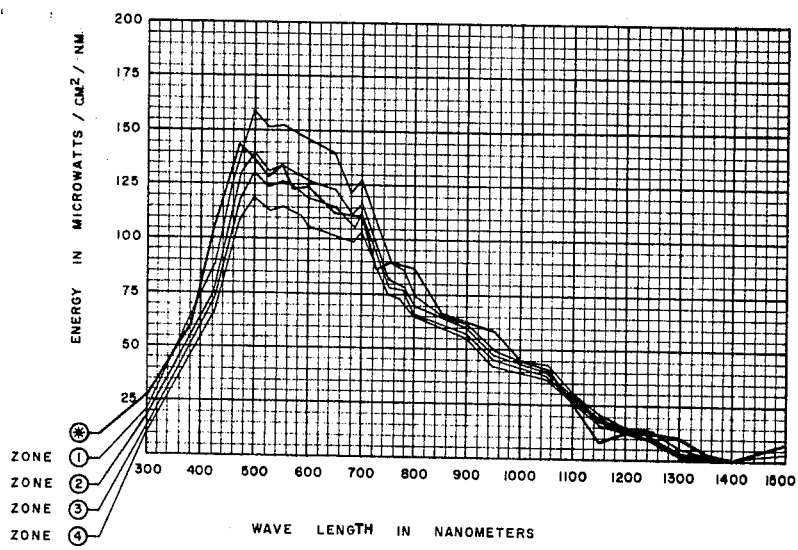

A light reflector 44, positioned within the growth chamber 25, above the light source assembly 37, together with the stainless construction of the chamber, directs light from the Xenon tube 38 downwardly towards the bottom of the chamber 25. As can be seen from FIG. 9, which shows a chamber with light zones marked thereon and FIG. 10 which shows the relative energy distribution from the Xenon tube 38 within the zones of FIG. 9, the energy levels are maintained substantially constant throughout the entire growth chamber.

Figure 7:
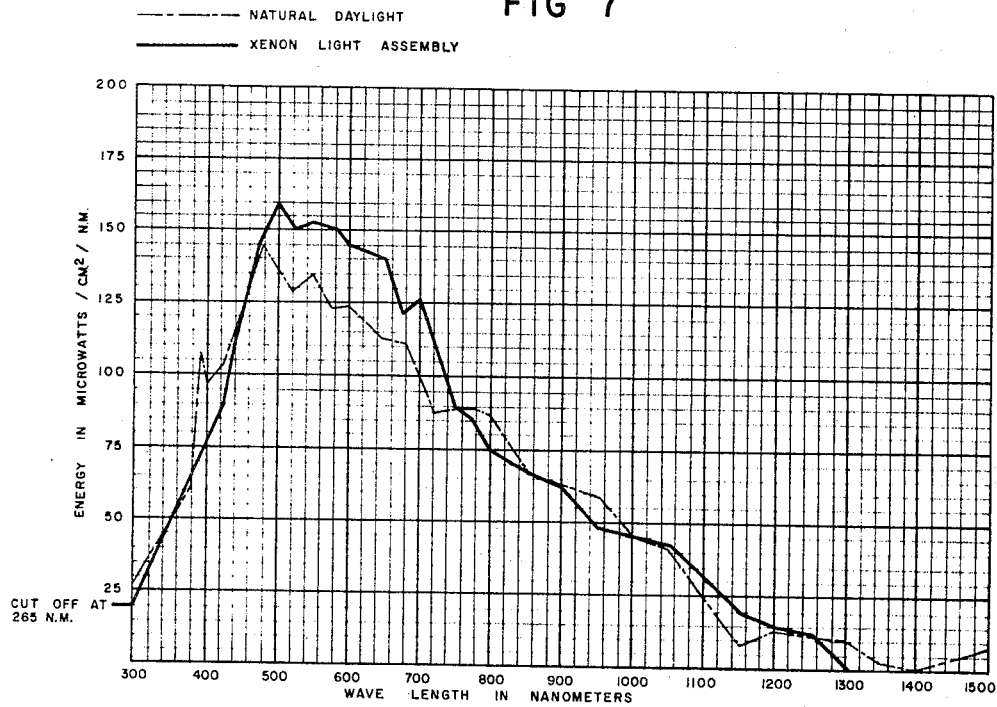

The close approximation of the light produced by natural daylight and that produced by the light source 37 is shown by the chart of FIG. 7. As determined by use of a spectro radiometer, the energy level in microwatts per square centimeter, per nanometer is determined and plotted for various light ray frequencies throughout the light spectrum of natural sunlight at 2:00 P.M., Mountain Daylight Savings Time at Salt Lake City, Utah, elevation 4,200 feet. Similarly, the spectro-radiometer is used within the chamber 20 to determine the energy level of the various wave lengths produced by light source 37 and the figures obtained are plotted. As can be seen in FIG. 7, the curves formed by connecting the plotted energy levels of natural sunlight and of the generated light are very close through the entire spectrum range plotted, i.e., 300 nanometers to 1,500 nanometers. This spectrum range includes all light having any significant effect on plant photosynthesis and includes the significant ultra-violet rays in the 280–500 nanometer range; the visable light rays in the 500–1,100 nanometer range, both of which kinds of rays contribute significantly to plant photosynthesis; and the infrared rays in the 1,100–1,500 nanometer range, which produce heat necessary to cause normal plant sweating. While some incidental energy spikes are produced by the present lighting system that greatly exceed the energy level of normal daylight, these are so infrequent and are of such short duration that they are not shown on the graph and have no practical effect on the lighting system or its use.

Figure 8:
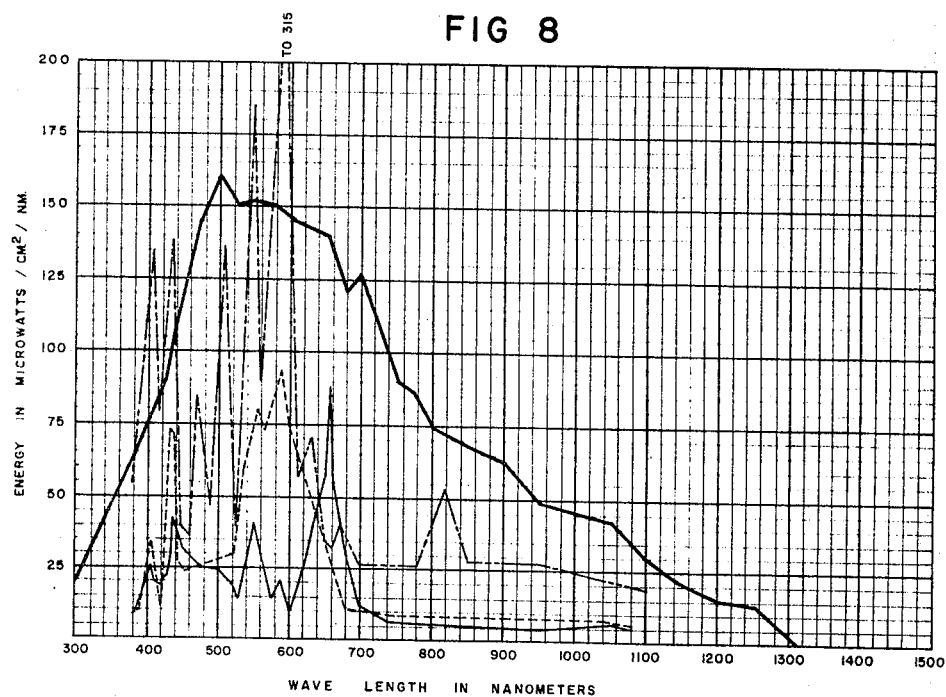

The chart clearly demonstrates the lack of similarity of light emitted from the Xenon light assembly to the other commercially available light sources. The chart shown in FIG. 8 represents spectral comparisons of light emitted from the Xenon light assembly 37 with other light sources which have been used in other environmental chambers as substitutes for natural sunlight.

An air supply duct 45 circulates air from a fan 46 over the sample tray 31 and through a return duct 47. Support equipment, comprising a cooling coil 48, a dehumidifier coil 49, electric heating elements 50, and a humidifier assembly 51 are all positioned within the air flow system, between the return air duct 47 and the circulating fan 46. Air passing through the growth chamber 25 and out of return duct 47 is reconditioned by these components before it is again circulated by fan 46 back through the supply duct 45 into the growth chamber. The air is circulated both below and above the filter screen 33 when the screen is pulled out by motor 35 and is stretched substantially between the front, back and side walls. Thus, no damaging heat build up occurs above the screen.

The growth chamber 25 is separated from the support equipment by a flooring 52. The extent of conditioning performed on air to be circulated through the growth chamber is regulated electrically from a control panel 70 which is located on the front of the equipment enclosure 26.

The equipment enclosure contains support and command apparatus for programming and directing the functions involved in creating desired environmental conditions within the growth chamber 25. This support and command apparatus includes a lamp power control housing 53, an electrical box 54, a refrigeration condensing unit 55, and a lamp cooling system consisting of a heat exchanger 56 and pump 57. A temperature humidity recorder chart 71 is mounted to have its chart face viewable at the front wall 21 of the equipment enclosure 26. The recorder thus provides an easily viewed, continuous, chronological record of the temperature and humidity within the chamber.

Figure 6:
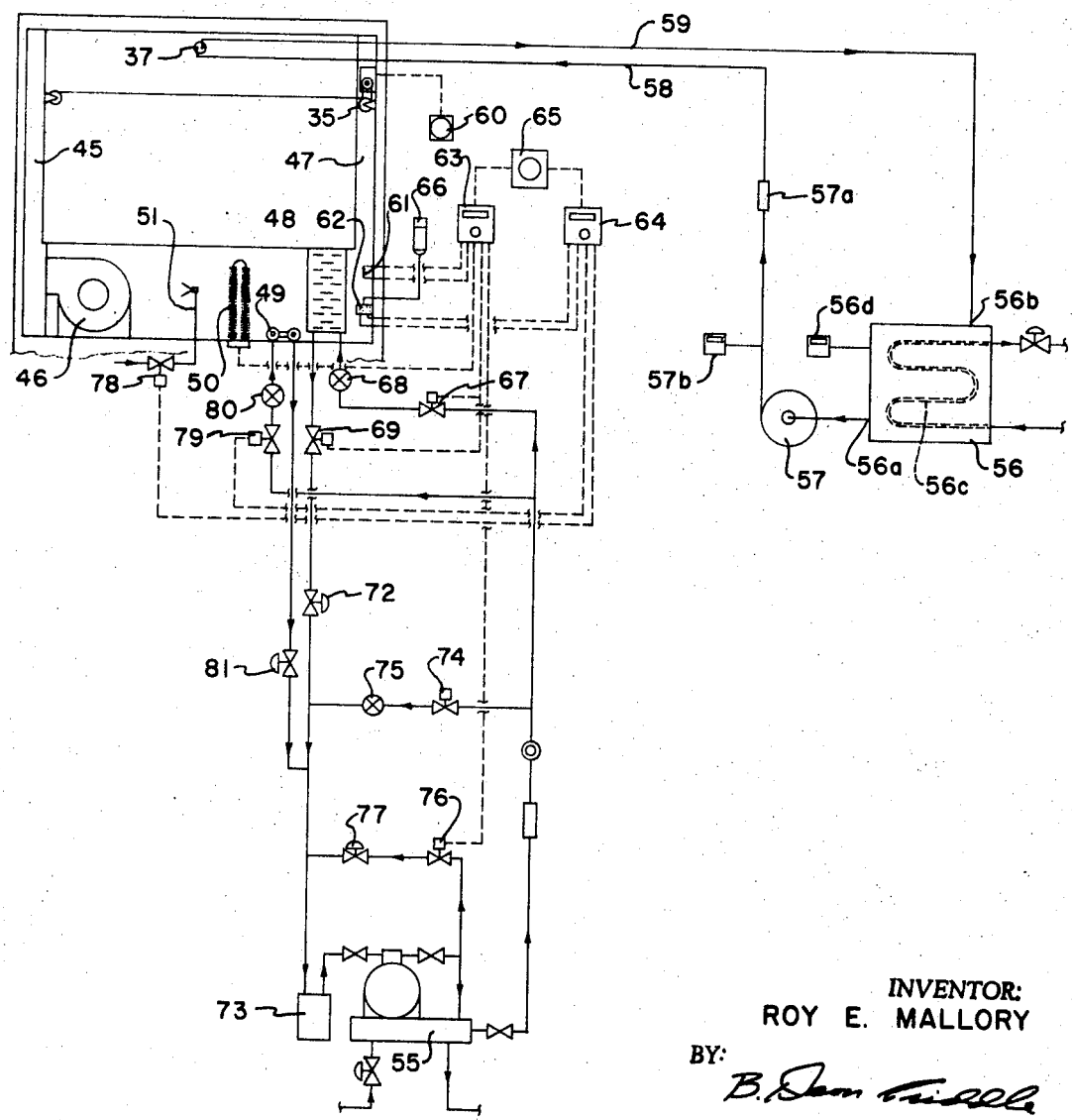

In FIG. 6, the component relationships are schematically illustrated and the overall operation of the chamber is best explained in connection with the schematic illustration of the interaction of the equipment and apparatus within the environmental chamber. As illustrated, the lamp assembly 37 may consist of an Osram Xenon Arc Lamp housed in an assembly of the type heretofore described. The lamp assembly is water cooled through an inlet line 58 and an outlet line 59, respectively connected to the outlet 56a and inlet 56b of the heat exchanger 56. The heat exchanger 56 has a coil 56c through which coolant is circulated and temperature responsive switch 56d that is in contact with the water circulated through the heat exchanger to be responsive to the temperature thereof. A lamp cooling pump 57 pumps water from the heat exchanger 56 into the inlet line 58 and through a de-ionizing filter 57a to the Xenon lamp assembly 37.

A water pressure failure switch 57b is connected electrically to the lamp power circuit so that, should the water pressure fall below a predetermined value, i.e., 5 p.s.i., power to the lamp is automatically cut off, thereby preventing overheating of the lamp. The water temperature responsive switch 56d is also connected electrically to the lamp circuit so that should the water temperature exceed a set point (120° F. for example) the lamp will be turned off.

As has been previously explained, the diurnal filter 32 is positioned by a motor 35, which is controlled by a diurnal cycle timer 60.

In normal operation, air is circulated from blower 46, through supply duct 45 and into the chamber. The air moves through the interior of the chamber, and is returned through the air duct 47 to blower 46. A dry bulb temperature sensor 61 and a wet bulb temperature sensor 62 are located in duct 47. These sensors generate electrical signals which are fed to a temperature controller 63, which may be a Honeywell model R 7306A w/55P140D010, for example, and a humidity controller 64, which may be a Honeywell model R7306B w/SSP140D020. The controllers act to compare actual conditions of the air within the return air duct 47 with programmed condtions sent to them from a programmer 65. As shown, a conventional phyrometer assembly 66, supplies water to the wet bulb wick of the wet bulb temperature sensor 62.

Depending upon the program established for programmer 65, as determined by an operator who sets the control dials of control panel 70, the programmer 65 and the actual conditions sensed by sensors 61 and 62, the temperature controller 63 will cause heating or cooling of the air before it is forced into the chamber by fan 46. If heating is required temperature controller 63 actuates the electrical heating elements 50 while at the same time turning off the air cooling equipment used. If air cooling is required, temperature controller 63 deenergizes the heating elements 50 and opens a valve 67. Opening of valve 67 permits water to flow from the refrigeration condensing unit 55 through a valve 68 and into and through the cooling coil 48. From the cooling coil, the water flows through a suction shut off valve 69, through a suction regulator 72, and into a suction accumulator 73. Thereafter it flows back to the refrigeration condensing unit 55. When the water from the condensing unit has sufficiently cooled the air flow, the water is diverted through a liquid injection shut off valve 74 through valve 75 and back to the suction accumulator 73. Cycling of the refrigeration condensing unit 55 occurs if the suction pressure is not maintained at a desired level, i.e., approximately 10 p.s.i. Therefore, to avoid cycling when the demand for air conditioning stops, with a resultant drop in compressor suction, a hot gas, by-pass shut off valve 76 is opened to divert discharge gas from the refrigeration condensing unit 55 through a hot gas, by-pass valve 77 and to the suction accumulator 73, thereby maintaining suction pressure at the desired valve.

Conditions of humidity are transmitted to the humidity controller 64, where they are compared with conditions set into the programmer 65 by an operator setting the dials of control panel 70. If it is determined by the controller 64 that additional moisture content is needed the controller 64 opens the humidifier inlet valve 78 thereby permitting water from the stream supply to flow to the humidifier assembly 51. Shoud conditons sensed in the return air duct 47, as compared with conditions set into the programmer 65, indicate that the returning air should be dehumidified, the humidity controller 64 closes humidifier inlet valve 78 and opens dehumidifier inlet valve 79. Coolant water is thereby allowed to flow from the refrigeration condensing unit 55, through a check valve 80 and into the dehumidifier coil 49, where the cold water acts to condense moisture from air passing the coil. The water is then returned to the refrigeration condensing unit 55 through a dehumidifier regulator valve 81.

Electricity is supplied to the various valves, pumps, motors, heating elements, controllers, etc. from the electrical box 54, with electrical energization, operation and control of the Xenon lamp assembly being supplied from the lamp power control housing 53 in conventional fashion. Because of the high operating heat generated by the Xenon lamp, the lamp circuit includes the water termperature responsive switch 56d and the water pressure failure switch 57b to insure that lamp cooling is available when the lamp is operating. The lamp power control housing 53 contains timers which initiate lamp ignition by firing a lamp ignitor. The timers are deactivated when lamp ignition is sensed.

The control panel 70 also mounted thereon various monitor gauges, which indicate conditions within the growth chamber; programming means for setting in desired environmental conditions; and switches for energizing, deenergizing, and controlling electrical circuits to the various apparatus within the chamber.

While the invention has been particularly described as being useful for plant growth studies, it has many other uses. For example, air pollution studies can be made using the environmental chamber and particularly studies of the effects of sunlight on emitted pollutants and possible pollutants can be made in the laboratory.

Although a preferred form of my invention has been herein disclosed, it is to be understood that the present disclosure is by way of example and that variations are possible without departing from the subject matter coming within the scope of the following claims, which subject matter I regard as my invention.

I claim:
1. An environmental chamber comprising
   an enclosure having
      a top;
      a bottom;
      end walls interconnecting said top and said bottom;
      side walls interconnecting said top, bottom, and end walls;
   a light generating source producing light having a spectrum closely approaching that of natural daylight positioned close to and beneath the top;
   circuit means connecting said light generating source to a source of electricity filter means below the light generating means and above the bottom;
   means for positioning said filter means to stretch substatnially between the end and side walls;
   air conditioning means having means for circulating air through the chamber above and below the filter means, means for heating the circulated air, means for cooling the circulated air, and means for adding moisture to the air; and
   means, including a control panel on the chamber for establishing air temperature, and humidity in the chamber.

2. An environmental chamber as in claim 1, wherein the filter means comprises a rolled screen of partially opaque material.

3. An environmental chamber as in claim 2, wherein the means for positioning the screen comprises a spring-type reel on which the screen is wound, a take-up reel at least one cable connecting an end of the screen and the take-up reel and a reversible motor arranged to reversibly drive the take-up reel.

4. An environmental chamber as in claim 3, wherein the filter means comprises a plurality of filters of different degrees opaqueness; and
   the means for positioning said filter means comprises programming means to selectively position the filters whereby the lgiht spectrum at the side of the filters opposite the light generating source can be varied as necessary to coorrespond to natural daylight spectrum.

5. An environmental chamber as in claim 4, wherein the plurality of filters are continuously connected to form the roller screen.

6. An environmental chamber as in claim 4, wherein at least some of the filters are arranged to be stretched in layers beneath the Xenon lamp.

7. An environmental chamber as in claim 1, wherein the light generating source is an Xenon lamp.

8. An environmental chamber as in claim 7, further including means for continuously circulating a coolant around the Xenon lamp.

9. An environmental chamber as in claim 1, wherein the filter means comprises a plurality of filters of different degrees opaqueness; and
   the means for positioning said filter means comrpises programming means to selectively position the filters whereby the light spectrum at the side of the filters opposite the light generating source can be varied as necessary to correspond to natural daylight spectrum.

* * * * *